United States Patent [19]

Bartholomew et al.

[11] Patent Number: 5,530,737
[45] Date of Patent: * Jun. 25, 1996

[54] SECURE ACCESS TELEPHONE EXTENSION SYSTEM AND METHOD

[75] Inventors: David B. Bartholomew, West Valley City; A. Ray Ivie, Orem; Alma K. Schurig, Provo, all of Utah

[73] Assignee: Phonex Corporation, Midvale, Utah

[ * ] Notice: The portion of the term of this patent subsequent to Jan. 22, 2012, has been disclaimed.

[21] Appl. No.: 34,086

[22] Filed: Mar. 22, 1993

[51] Int. Cl.⁶ .................................................. H04M 11/00
[52] U.S. Cl. ................................................ 379/62; 379/66
[58] Field of Search .................................... 379/66, 63, 62; 340/310 CP, 310 A, 310 R; 307/1, 2, 3, 4, 5; 189/188; 370/60

[56] References Cited

U.S. PATENT DOCUMENTS

| | | | |
|---|---|---|---|
| 3,809,816 | 5/1974 | Reed . | |
| 3,949,172 | 4/1976 | Brown . | |
| 4,013,840 | 3/1977 | Anderson . | |
| 4,058,678 | 11/1977 | Dunn . | |
| 4,218,655 | 8/1980 | Johnson | 455/39 |
| 4,222,035 | 9/1980 | Loholf | 340/310 A |
| 4,254,403 | 3/1981 | Perez-Carero | 340/310 R |
| 4,455,651 | 6/1984 | Baran | 370/104 |
| 4,471,339 | 9/1984 | Udren | 361/64 |
| 4,475,193 | 10/1984 | Brown | 370/124 |
| 4,479,033 | 10/1984 | Brown et al. | 379/66 |
| 4,495,386 | 1/1985 | Brown . | |
| 4,514,594 | 4/1985 | Brown . | |
| 4,523,307 | 6/1985 | Brown et al. | 379/66 |
| 4,559,520 | 12/1985 | Johnston | 340/310 R |
| 4,641,126 | 2/1987 | Crowe | 340/310 A |
| 4,641,322 | 2/1987 | Haregawa | 375/1 |
| 4,688,210 | 8/1987 | Eizenhofer | 370/18 |
| 4,701,945 | 10/1987 | Pedigo | 379/66 |
| 4,759,016 | 6/1988 | Otsuka | 370/95.3 |
| 4,793,780 | 11/1988 | Alexis | 370/95 |
| 4,864,589 | 9/1989 | Endo | 375/1 |
| 4,901,307 | 2/1990 | Gilhousen | 370/18 |
| 4,963,853 | 10/1990 | Mak | 340/310 A |
| 4,968,970 | 11/1990 | Le Porte | 340/310 A |
| 5,101,501 | 5/1992 | Gilhousen | 455/33 |
| 5,136,612 | 8/1992 | Bi | 375/1 |

Primary Examiner—Curtis Kuntz
Assistant Examiner—Michael B. Chernoff
Attorney, Agent, or Firm—Lee A. Hollaar; Daniel P. McCarthy

[57] ABSTRACT

A method and system is provided for conducting secure power line carrier communications in full duplex over the power lines of a building. Power line carrier current telephone extension systems utilize 1) a single BASE unit per central office line (for interfacing line carrier signals with the central office line) and 2) one or more EXTENSION units, one for each extension phone set (for interfacing said line carrier signals with said extension phone sets). The method employs system control logic for providing A) multiple extension arbitration logic, B) privacy from eavesdropping and C) security from third party central office line capture by means of a digital messaging system in each base and extension unit utilizing a unique and matching security key (preamble) with each message instructing the system to change operating states, such as, A) during a conversation an extension unit may be put on hold so that a second matching extension can pick up the line, B) a base unit rings matching extension units to signal an incoming call or C) an outgoing call is initiated by a user taking a matching extension phone off hook to access the central office line. Matching of the random security codes may be initiated by the user. By this means unauthorized access to the central office line (especially for long distance calls) and eavesdropping by other users in the same building with similar line carrier telephone extension products is prohibited.

14 Claims, 6 Drawing Sheets

SECURE ACCESS TELEPHONE EXTENSION SYSTEM AND METHOD

BACKGROUND OF THE INVENTION

A. Field of the Invention

This invention relates to the field of power line carrier current telephone extension systems. More particularly, this invention relates to secure system control protocols for line carrier telephone extension systems, which provide multiple extension arbitration logic, privacy, security and other telephone signaling options, which technique is called Secure Access (SA).

B. The Background Art

Numerous attempts have been made to utilize the power lines of buildings for telephone communications with varying degrees of success. Line carrier telephone extension systems utilize 1) a single BASE unit per central office line (for interfacing line carrier signals with the central office line) and 2) one or more EXTENSION units, one for each extension phone set (for interfacing said line carrier signals with said extension phone sets). Full duplex communication is usually attempted by using two carrier frequencies, one for each direction. Usually a transmitter and receiver are included in each base and extension station which are operating simultaneously when communication is in progress. For economic reasons FM modulation of the carrier by audio (speech) signals is often employed, of which U.S. Pat. Nos. 3,949,172 and 4,701,945 are examples. The physical range of line carrier communications systems is usually limited to the confines of the secondary of the power line transformer and is subject to severe noise and attenuation variances depending upon carrier frequencies and load conditions.

While noise and attenuation problems may be overcome somewhat by increasing transmitter power levels or increasing receiver sensitivity, this increases the potential for interference from neighbors with similar systems, which aggravates the problems of privacy and security prior art line carrier systems exhibit. Thus, privacy or security breaches arise when other users on the same power distribution system or in the same apartment complex with the same line carrier devices can make long distance calls on another user's line and eavesdrop on their conversations. But people driving by in cars cannot scan and eavesdrop on the line carrier signals the way they can cordless phone RF transmissions. The impact of these problems has already been demonstrated in the cordless telephone industry, which shares some of the same limitations as the line carrier industry. Security from line capture by third parties has been provided by security coding protocols in the cordless phone industry. But people with scanners or cordless phone receivers can eavesdrop on a neighbor's cordless call. Also, no provision is made for multiple cordless extension phones utilizing the same base. Similarly, in line carrier systems it was not permitted for more than one system to use the same power lines in the same building.

The subject matter of the instant invention relates somewhat to that of a previous application by the inventors hereof filed Oct. 7, 1991, Ser. No. 07/773,009 now U.S. Pat. No. 5,319,634, entitled "MULTIPLE ACCESS TELEPHONE EXTENSION SYSTEMS AND METHOD". The previous application relates primarily to a combination of radio frequency (RF) transmission techniques such as frequency division multiple access (FDMA) and code division multiple access (CDMA or spread spectrum). The instant application relates to the use of audio and subaudio frequency system control logic keys which unlock telephone signalling, RF and voice transmissions such as capturing the central office line, ringing the extension and speaking in full duplex between the base and extension units. The use of system control logic messages with security keys allows for non-simultaneous multiple use of the same power distribution system with privacy from eavesdropping and security. The system control logic also prevents another user from interrupting and terminating a call which is in progress. Other multiple extension arbitration logic functions are provided to permit one extension to put a call on hold and transfer the call to another extension unit. Use of FDMA in combination with security/control keys provides true multiple access and security at a low cost.

Commercial applications for the secure access line carrier telephone; extension technology include computer modem interfaces for pay-per-view (PPV) systems and gas pump/security office systems, where it is difficult to retrofit phone lines and twisted pairs into existing construction.

Since an increasing number of people live in apartments and condominiums which share power lines and because an increase in transmission power and receiver sensitivity are required to overcome attenuation and noise problems, it is important for a telephone extension system to utilize privacy and security coding in a unique and skillful manner to permit acceptable operation.

SUMMARY OF THE INVENTION

Many prior art limitations can be overcome by proper application of secure access techniques as employed in the instant invention. Secure access (SA) techniques include the use of a digital data transmission channel operating at audio FSK rates which exchanges messages between base and extension unit controllers, which messages are composed of a sync byte, a unique security key and a system control key. SA techniques require hardware "locks" on audio, RF and system control paths which can only be connected ("opened") by receipt of the proper control key. The message can be Manchester encoded to eliminate any net DC component to the message when modulated and demodulated. Data transmission techniques such as Manchester encoding are described in the ITT "Reference Data for Radio Engineers", Fifth Ed., Howard W. Sams & Co., 1972, which is made a part hereof by reference.

A sync byte (8 bits) at the first part of the message allows for the receiving controller to determine that a message is being sent and that the digital 1's and 0's which follow in the keys will be valid in certain time slots. Thus, the sync byte very quickly initializes a digital phase-locked loop in the receiving controller and facilitates asynchronous communications. It is important for the communication to initialize rather quickly with respect to ring commands, pulse dialing and off hookflash signals for the line carrier extension system to be transparent with respect to most phone user services. On the other hand increasing the data rate too high will make the data susceptible to noise and interference corruption due to loss of processing gain. Realistic data rates are about 1 to 4 KBs.

The security key follows the sync byte and may be of any practical length, such as 16 bits (2 bytes), providing for 65,536 codes. Receipt of a valid security code enables the control key, which follows. The security codes may be either randomly selected by the controller or manually selected by user accessible switches. A security code matching procedure provides for base and extension units to share the same code and thus be able to accept control keys from each other.

The control key follows the security key and may be 1 or 2 bytes long depending on the sophistication required by the system control logic. For example, a pulse command might require 2 bytes if the first byte is the "pulse" command and the second byte specifies the duration of the pulse, thereby distinguishing between pulse dial pulses and "flash" pulses used for call waiting, etc. Thus, telephone control signals are resynthesized by the base or extension controller as requested by control keys for transparent operation.

To complete the system requirements for secure access, hardware locks (digitally controlled analog switches) must be provided in all essential telephone signal and control paths which are operated by the system controller when proper security and control keys are received.

Since prior art line carrier telephone extension systems do not combine the essential elements of secure access technology, they cannot operate in an acceptable commercial manner.

Accordingly, it is an object of the present invention to provide an effective method of secure access (SA) communication which provides for access of a plurality of signals on a single communications medium.

It is a further object to provide a method and system of line carrier telephone communications which utilizes SA (secure access) to provide a high degree of security for preventing unauthorized access to the subscriber's line, and which provides privacy with respect to the conversation from third parties, and which provides nearly transparent interconnectivity between extension phones and the central office line.

It is an object to provide a method and system of multiple extension arbitration logic to provide multiple extensions for the same subscriber line which do not interfere with each other.

An additional object is to provide a method and system of line carrier telephone communications which utilizes FDMA (frequency DIVISION MULTIPLE access) in combination with SA (secure access) to prevent interference between relatively close neighboring transmission systems or partner transmissions in the same system and to provide for multiple access (simultaneous transmission) of duplex signals for at least two telephone lines.

It is an object to provide a method and system of secure access cordless telephone communications which applies the same secure access techniques to obtain the same advantages as for the line carrier telephone extension systems and method.

These and other objects and advantages of the invention and method will become more fully apparent as the description which follows is read in conjunction with the drawings.

DESCRIPTION OF THE PREFERRED EMBODIMENTS

Figure 1:
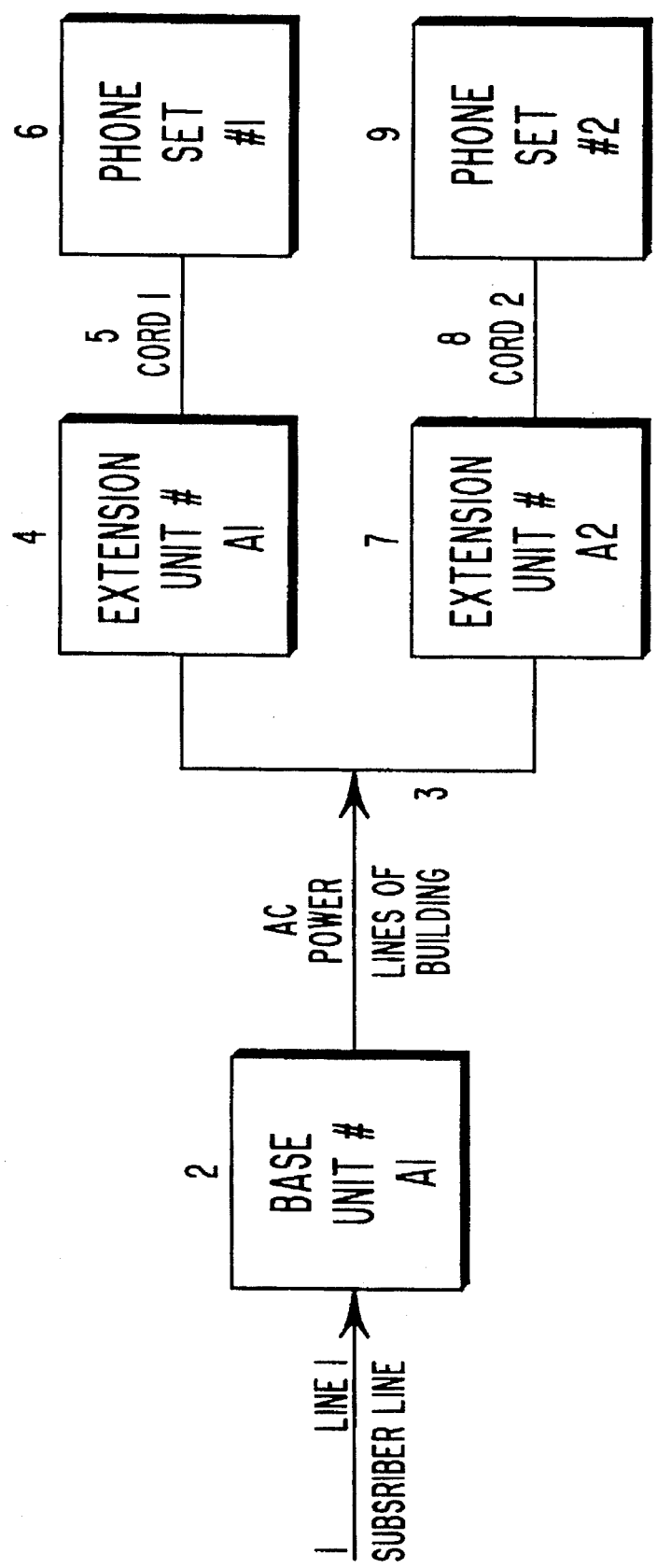
FIG. 1 is a block diagram of a line carrier telephone extension system servicing a single subscriber line and a plurality of extension phone sets.

Reference is first made to the illustration of a line carrier telephone extension system in FIG. 1 which services a single subscriber line 1 and a plurality of extension phone sets 6 and 9. Subscriber line 1 plugs into base unit 2 which provides the interface circuitry and protocols for the subscriber line signals (including ring, off hook and duplex audio) and for secure access power line carrier signals, which are carried through a building via AC power lines 3 to extension interface units 4 and 7. The extension units 4 and 7 are single line extensions and provide means to interface the secure access line carrier signals to single line phone sets 6 and 9 via cords 5 and 8, respectively.

A line carrier system as illustrated in FIG. 1 must operate in a manner which is transparent to the extension phone set user. Thus, by means of base unit 2, AC power lines 3 and extension unit 4, an incoming ring signal is detected in the base unit, encoded into secure access line carrier signals, transferred through the power line, decoded in the extension unit and converted to a ring signal of identical length for extension phone set 6. When a user picks up she receiver of an extension phone set, it goes off hook, which condition is detected in the extension unit 4, encoded by said extension unit into secure access line carrier signals and transmitted via power lines 3 to the base unit 2 where the secure access line carrier signals are decoded and the subscriber line is captured by off hook circuitry. Duplex audio circuitry is unlocked and connected to the line and bidirectional transmission of voice and/or dial tones and DTMF takes place, with the voice signals modulating line carrier signals, which are transmitted via power lines 3 and decoded/demodulated back into voice in the base and extension units. Specific subsystems and corresponding functions will be addressed in reference to FIGS. 5 and 6.

FIG. 1 also may be used to illustrate multiple extension arbitration logic. For example, when a central office sends a ring signal through the subscriber line 1 into the base unit 2, the base unit 2 qualifies the ring signal for both frequency (15 to 110 Hz) and amplitude (40 Vrms min.) and sends start and stop ring messages to both extension units 4 and 7, which ring messages are detected and converted to standard ring signals which ring both phone sets 6 and 7 with substantially the same ring cadence as that of the original central office ring signal. Suppose a user then takes phone set #2 (9) off hook, which is detected in the corresponding extension unit #A2 (7), which unit sends an off hook request message to the base unit 2 which 1) qualifies the security code and off hook message, 2) captures the subscriber line and 3) sends and off hook acknowledgment message to both extension units, which off hook acknowledgment message allows only extension unit #A2 (7) to connect audio and signalling circuitry between itself 7 and phone set #2 (9), enabling the user to engage in normal telephone communications. If a second user at phone set 16 takes his receiver off hook while phone set #2 (9) is in use, the system control logic in extension unit #A1 (4) will produce a busy tone for phone set #1 (6) and will not permit the second user access to the on going conversation because the system control logic recognizes that it did not make the first off hook request and was on hook when the first off hook acknowledgment was received. If, however, the first user goes on hook at phone set # 2 (9) while the second user at phone set #1 (6) is off hook, extension unit #A2 (7) will send a hang message to the base unit 2 which returns an "unack" message to all extension units (but does not immediately hang up), upon receipt of which unack message by extension unit #A1 (4) it sends an offhook request to the base unit 2 and connects audio upon receipt of an acknowledgment message from the base. Logic in the base unit refrains from hanging up the central office following a hang message for only sufficient time to permit a second extension to request the line following the unack message from the base.

Multiple extension arbitration logic permits a user to put a call on hold by pressing the switch hook twice quickly on his extension phone set 1 or 2. A tone generated in the corresponding extension unit 4 or 7 confirms the hold request state. The extension unit sends a hold message to the base unit 2 whereupon the base unit 1) mutes the subscriber line audio while still capturing the line and 2) sends to all extension units a 3 short ring cadence message every 45 seconds or so for ten periods, following which the base rings twice and waits a last 20 seconds before hanging up the line if the user does not take the call. During this time any extension phone set including hardwired phones can be taken offhook by a user and signal the holding base unit to go off hold; phone set 1 or 2 sends off hook requests to the base unit which unlocks the audio path; if a hard wired phone goes offhook, the base unit detects a drop in subscriber line voltage and releases line capture to the hard wired phone set. The system control logic is more particularly described in FIGS. 3 and 4.

Figure 2:
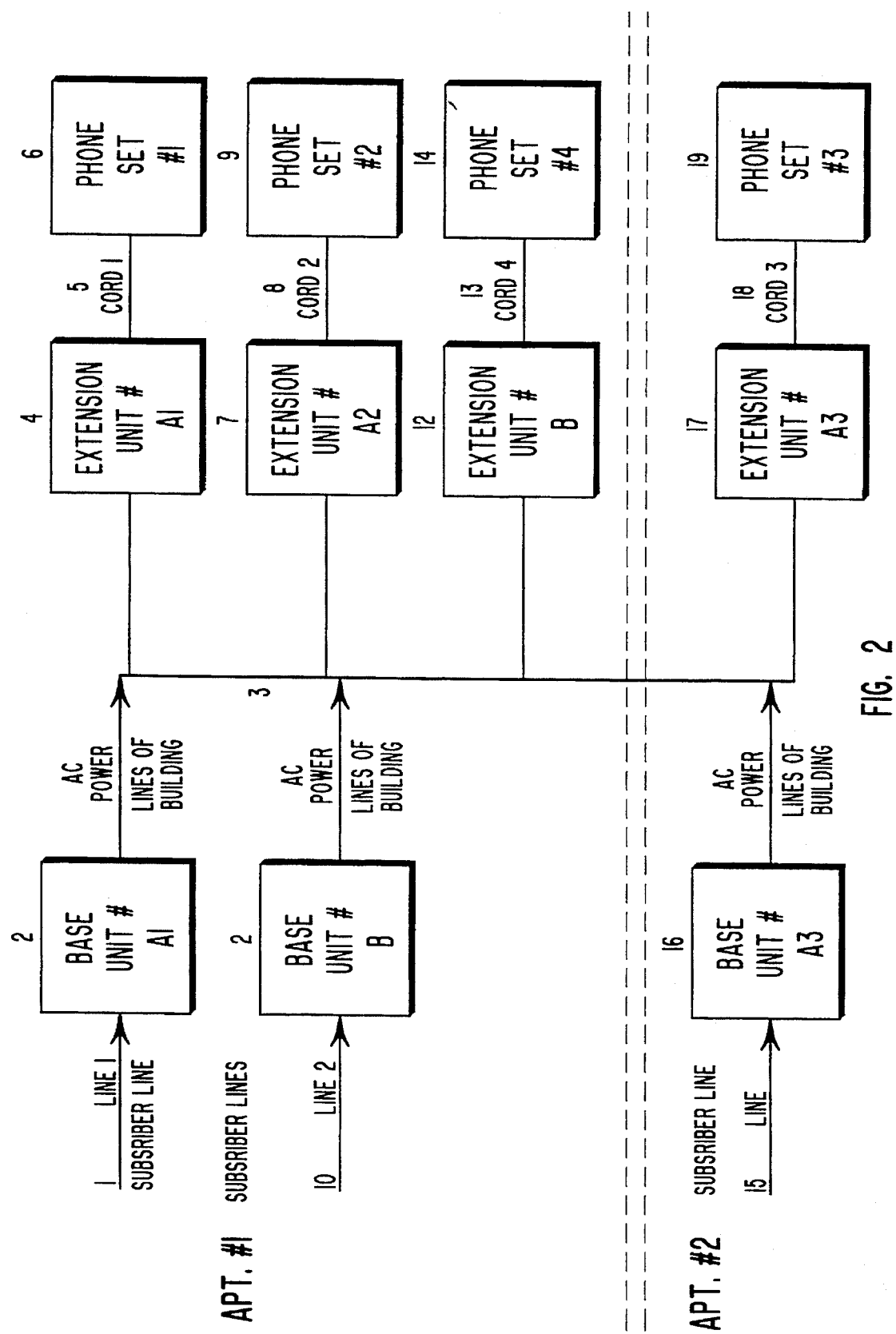
FIG. 2 is a block diagram of a line carrier telephone extension system servicing a plurality of subscriber lines and extension phones in an apartment complex with a common AC power distribution system.

FIG. 2 illustrates a combined application of secure access and multiple access technologies in which several apartments share a common AC power distribution system and service a plurality of subscribe telephone lines and line carrier extensions. Because all "A" units use the same line carrier frequencies, secure access techniques are required to provide privacy and security between Apt #1 line 1 and the Apt #2 line 15. The user in Apt #1 can match codes in his units by first pressing a button on base unit #A1 (2) and then within a minute pressing the corresponding buttons on extension unit #A1 (4) and #A2 (7). Pressing the buttons puts the units into the learn mode, where the extensions send out a request for the randomly selected security key in the base unit, which the base returns to the extension units. Since the user in Apt #2 has no idea when the user in Apt #1 is going to match his security codes, his units A3 will have a different code. This provides for the multiple use of the AC power lines by the A frequency units on a non-simultaneous basis. Base unit #B (11) and corresponding extension unit #B (12) use a different set of multiple access transmission frequencies, which provides for true simultaneous use of the AC line medium for line #2 (10). Line 2 could be used for a modem, fax, pay-per-view television service or other telephone apparatus.

Figure 3:
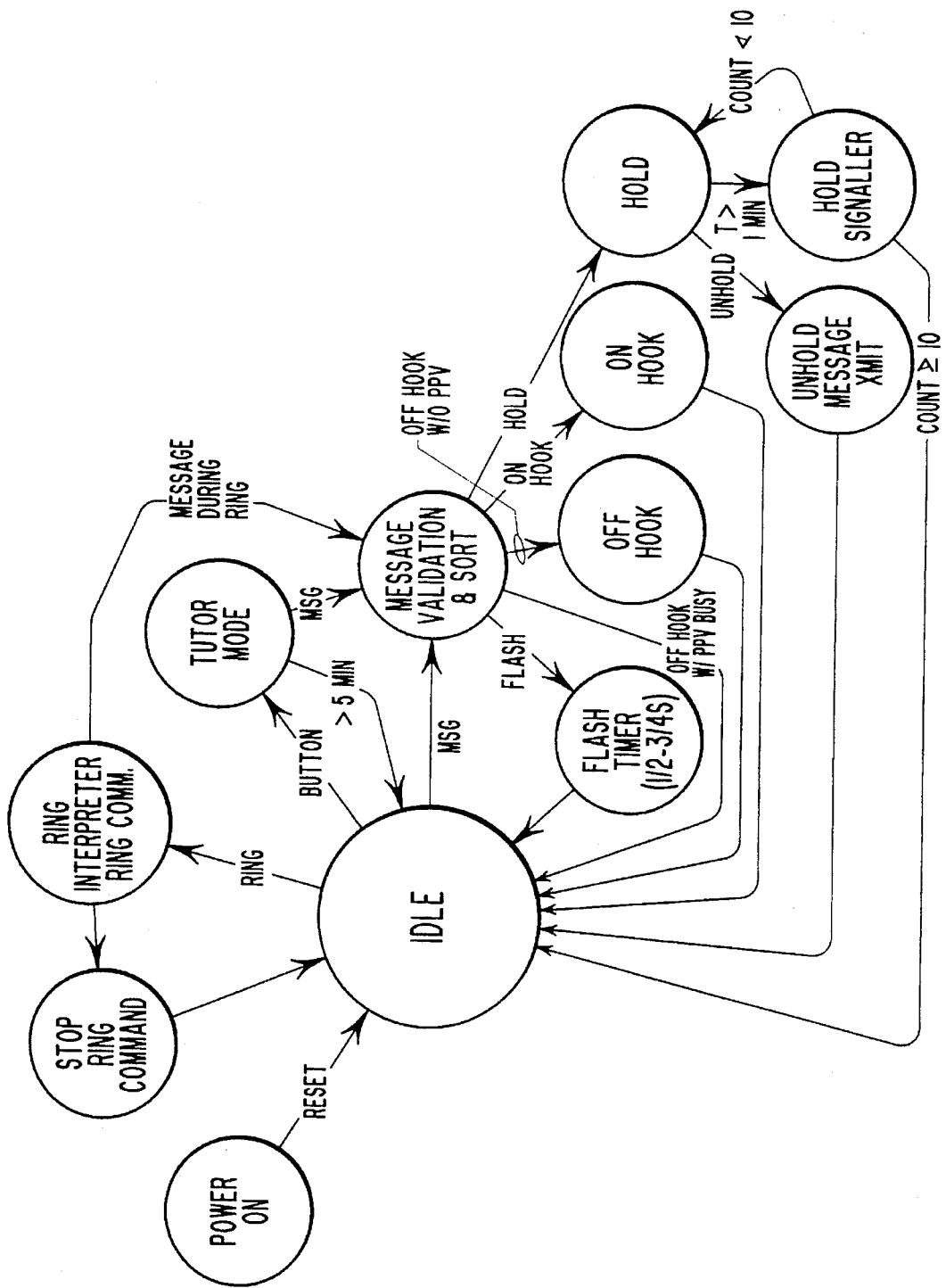
FIG. 3 a is a state diagram for a base unit system controller.
Figure 4:
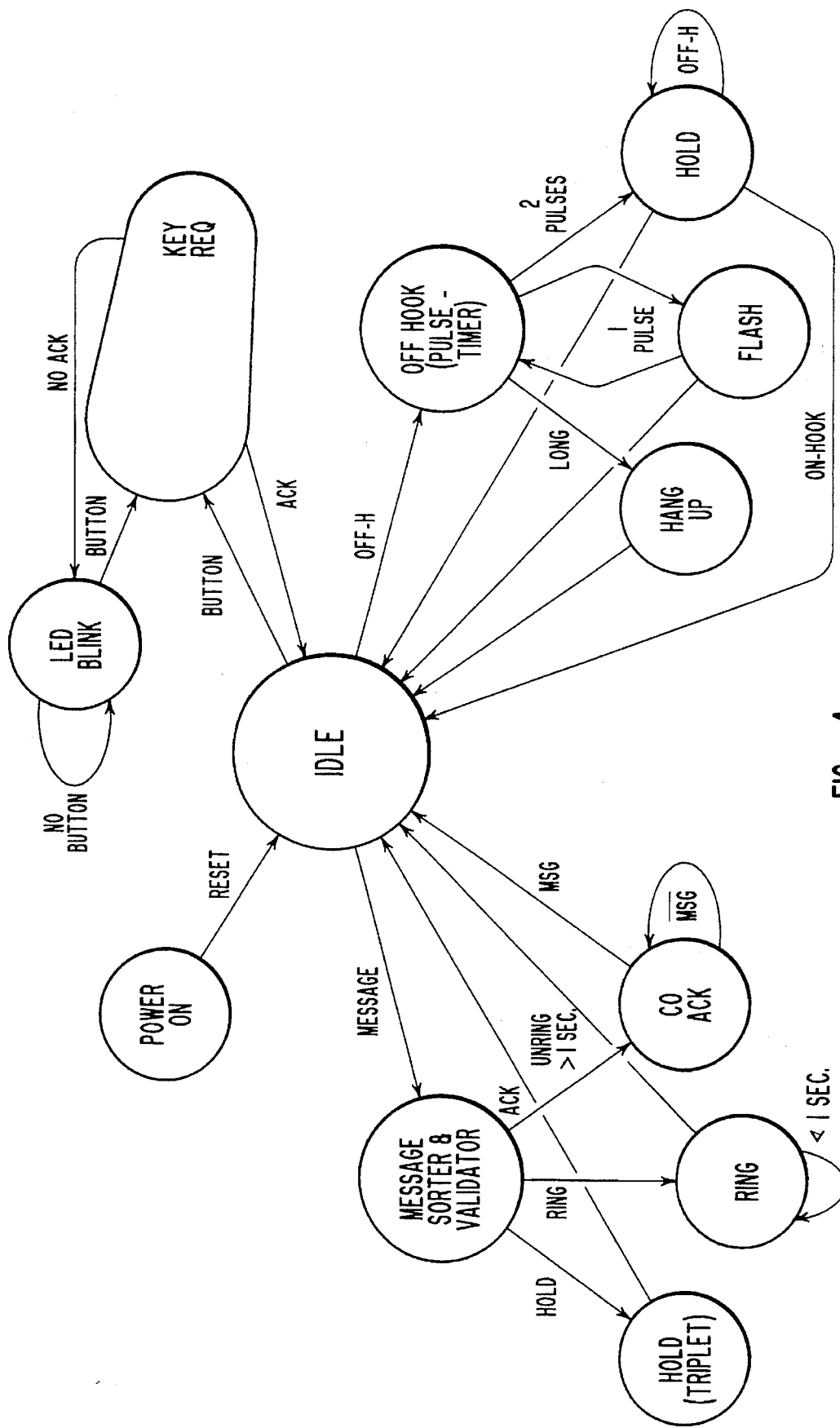
FIG. 4 is a state diagram for an extension unit system controller.

FIG. 3 and FIG. 4 provide a logic state diagram for the system control protocols disclosed above in connection with FIGS. 1 and 2, except for the power on procedure. If during a "power on" reset procedure a unit checks non-volatile memory for a valid security code and does not find one, then it provides a default security code; otherwise it uses the code retained in memory. Since no on/off switch is provided for the units, when the AC line power is on so are the units. In the event of a power failure or unplugging of a unit, the currently used security code is saved in non-volatile memory, so that when power is restored the security code is maintained. Any number of commercial low cost microcontrollers can be employed for this application, such as the Motorola 6805 series or the Zilog Z8 series. A listing of working commercial code for this application as used in one embodiment of the invention is provided in Appendix A and is incorporated herein by reference. Other code may be used as well and still fall within the scope of the invention.

Figure 5:
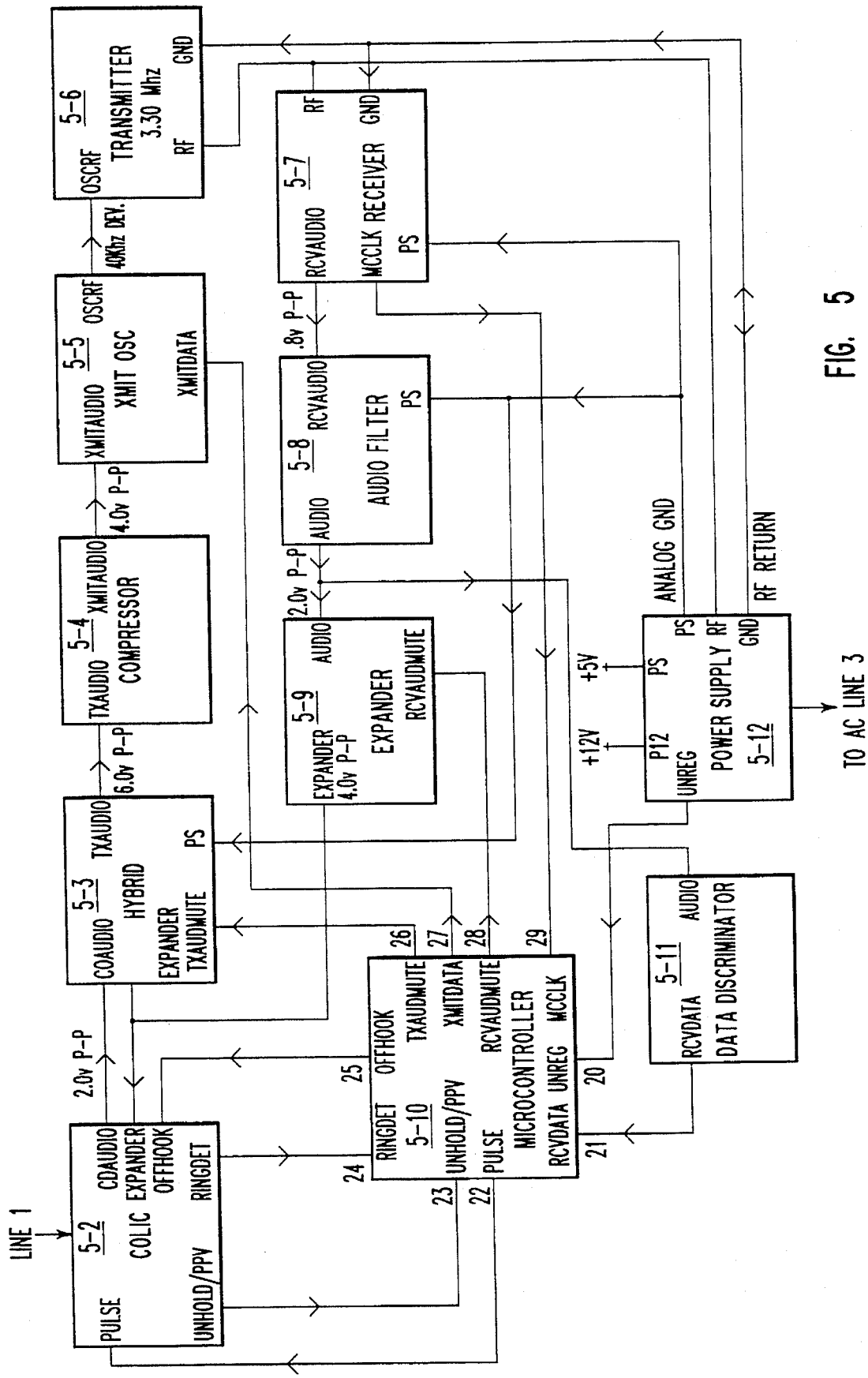
FIG. 5 is an electrical block diagram of a base unit of a secure access line carrier telephone extension system, which interfaces a subscriber line with the AC power distribution system of a building.

FIG. 5 is page 1 of a hierarchical schematic diagram of a secure access base unit 2 from the systems of FIG. 1 and 2. Each of the blocks 5-2 through 5-12 are illustrated as complete electrical schematics in Appendix B, according to hierarchical schematic: procedures. Appendix B is hereby incorporated by reference. Other electrical schematics embodying the inventors' invention may be employed as well and are intended be comprehended within the scope of the invention. Phone line 1 is connected to colic 5-2,, and AC power line 3 interfaces with power supply 5-12. Particular attention is directed to the microcontroller 5-10 with its attendant I/O lines 20 through 29. The "unreg" 20 input provides the power on/off reset of FIG. 3 and 4. On power up care is taken to start the controller after the power supplies and clock 29 are stable, and upon power down, to stop the controller before the clock and power supplies become unstable. Data from the extension(s) 4 is received and discriminated through blocks 5-12, 5-7, 5-8, and 5-11 and enters the microcontroller 5-10 via line 21 where the data is validated and sorted into system control instructions. Other hardware inputs include phone line 1 ring signal detection 24 and off hook status detection 23 with respect to hard wired phones on line 1. The microcontroller 5-10 logic acts upon these inputs to provide the appropriate system control responses. Ring signals at 24 produce ring messages at data output 27 which are transmitted via 5-5, 5-6, 5-12 and 3 to the extension unit(s). When an extension unit makes a central office request through 21, the base controller 5-10 takes line 1 off hook via control port 25, sends an acknowledgment message back to the extension unit, unmutes the transmit and receive audio via control ports 26 and 28, and the extension unit can either talk with a caller or, upon hearing a central office dial tone, send DTMF signals or pulse dial messages to dial a phone number. Pulse dial messages are processed through control port 22 for optimum compatibility with the central office. The flow of other audio and RF signals as indicated in FIG. 5 will be apparent to a person of ordinary skill in the art.

Figure 6:
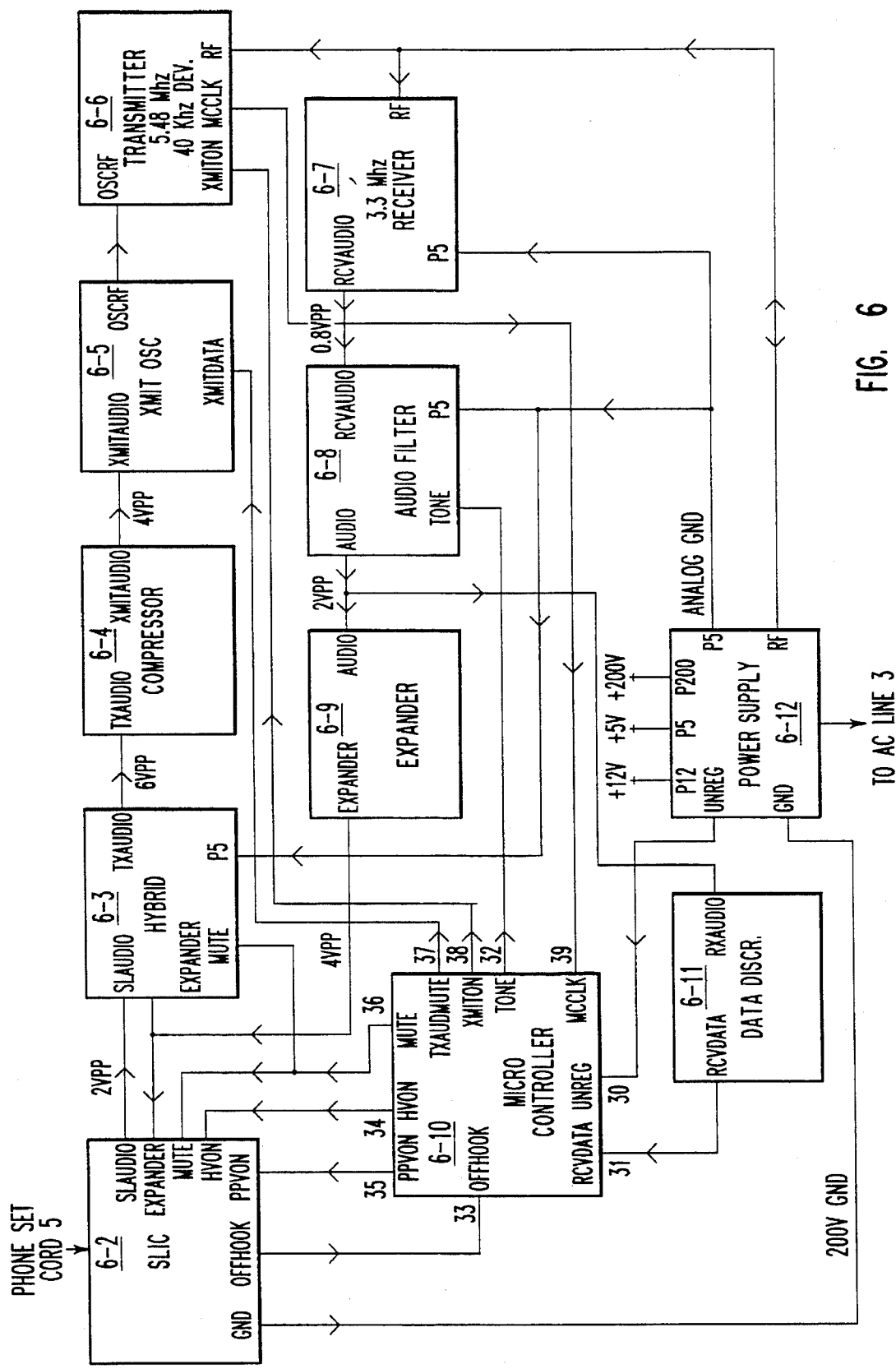
FIG. 6 is an electrical block diagram of an extension unit of a secure access line carrier telephone extension system, which interfaces an extension phone to the power line distribution system of a building.

FIG. 6 is page 1 of a hierarchical schematic diagram of a secure access extension unit 4 (or 7, 12 or 17). Each of the blocks 6-2 through 6-12 are illustrated as complete electrical schematics in Appendix B, according to hierarchical schematic procedures. Phone set cord 5 is connected to SLIC 6-2, and AC power line 3 interfaces with power supply 6-12. Attention is directed to the microcontroller 6-10 with its attendant I/O lines 30 through 39. The unreg 30 input provides the power on/off reset of FIG. 3 and 4. On power up care is taken to start the controller after the power supplies and clock 39 are stable, and upon power down, to stop the controller before the clock and power supplies become unstable. Data from the base unit 2 is received and discriminated through blocks 6-12, 6-7, 6-8, and 6-11 and enters the microcontroller 6-10 via line 31 where the data is validated and sorted into system control instructions. The other hardware input is off hook status detection 33 of the extension phone set 6. The microcontroller 6-10 logic acts upon these inputs to provide the appropriate system control responses. Ring messages from the base are validated and sent through port 34 to the slic 6-2 which rings the extension phone set 6. When a user takes the extension phone off hook, this indication at port 33 makes the controller turn off the high voltage ring at 34, check the status of the system for other extensions in use, and if all is clear, turn on the transmitter via 38, message the base 2 to access the central office line 1, receive and validate a "co acknowledgment" message returning through 31, unmute audio paths via 36, and the extension unit can either talk with a caller or, upon hearing a central office dial tone, send DTMF signals or pulse dial messages to dial a phone member. The extension unit can also indicate to certain phone accessories connected in place of phone set 6 that line 1 is in use by hardwired phone sets by means of port 35 and hardware in slic 6-2 which produces a lower line voltage at cord 5. The flow of other audio and RF signals as indicated in FIG. 6 will be apparent to a person of ordinary skill in the art.

Many variations on the system illustrated in FIGS. 1–6 are readily manifest from previous discussions herein. One obvious variation is the application of the herein described secure access techniques to a cordless extension telephone system, wherein an RF carrier replaces the power line carrier and an antenna replaces the power line interface.

Another variation replaces the analog compandor and FM modulation technique with a CVSD (continuously variable slope delta modulator) and FSK modulation. A CVSD may also be regarded as a single bit A/D converter with companding. A CVSD requires a 16 kBs to 32 kBs FSK rate at transmitter and receiver, which is practical with some commercial receiver chips. Security can be provided for digital data transmissions by providing encryption techniques.

Many receiver chips also provide FM demultiplex capability, which provides several additional approaches to audio and control signaling. For example, the secure access control signaling could be transmitted on an upper sideband simultaneously with lower sideband audio. This could enhance transparency of operation by not muting audio during certain signaling operations. Also, a separate data channel could be implemented using a subaudio modulation technique.

Some variations could be made in the structure of the secure access message and its sync techniques, system control instructions and security code structure/length. Because of the frequency lock between transmitter and receiver, synchronous data transmission techniques are feasible which simplify data discrimination.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for secure access in a telephone extension system, said telephone extension system having:
   a base unit, comprising:
      means for coupling to a subscriber telephone line;
      means for communications with one or more extension units; and
      means for generating a random security key;
   and at least one extension unit, comprising:
      means for communications with said base unit; and
      means for storing a security key;
   the method comprising the steps of:
      said base unit generating a random security key;
      said extension unit requesting a copy of said random security key from said base unit;
      said base unit returning a copy of said random security key to said extension unit only if said request from said extension unit is made within a predetermined time of said generating of said random security key; and
      said extension unit storing said random security key in said storage means.

2. A method as in claim 1, further comprising:
   said extension unit transmitting a copy of said random security key stored in said storage means before any communications with said base unit; and
   said base unit allowing said communications with said extension unit only if said copy of said security key matches said random security key.

3. A method as in claim 1, said base unit further comprising:
   means for initiating said generating of a random security key, operable by a user of said telephone extension system;
   and said step of generating a random security key occurs when said means for initiating said generating a random security key is operated by a user.

4. A method as in claim 3, wherein said means for initiating said generating of a random security key is a button on said base unit.

5. A method as in claim 1, said extension unit further comprising:
   means for initiating said requesting a copy of said random security key, operable by a user of said telephone extension system;
   and said step of requesting a copy of said random security key occurs when said means for initiating said requesting a copy of said random security key is operated by a user.

6. A method as in claim 5, wherein said means for initiating said requesting a copy of said random security key is a button on said extension unit.

7. A base unit for a telephone extension system, said telephone extension system having said base unit and at least one extension unit, said base unit comprising:
   means for coupling to a subscriber telephone line;
   means for communications with one or more extension units;
   means for generating a random security key;
   means for receiving a request from an extension unit for a copy of said random security key; and
   means for returning a copy of said random security key to said extension unit only if said request from said extension unit is made within a predetermined time of said generating of said random security key.

8. A base unit as in claim 7, further comprising:
   means for allowing communications with said extension unit only if said extension unit has transmitted a copy of said random security key.

9. A base unit as in claim 7, further comprising:

means for initiating said generating a random security key, operable by a user of said telephone extension system.

10. A base unit as in claim 9, wherein said means for initiating said generating of a random security key is a button on said base unit.

11. An extension unit for a telephone extension system, said telephone extension system having a base unit and said extension unit, said extension unit comprising:

means for communications with said base unit; and means for storing a security key;

means for requesting a copy of a random security key from said base unit, and said base unit returning a copy of said random security key to said extension unit only if said request from said extension unit is made within a predetermined time after said base unit generates said random security key; and means for storing said random security key.

12. An extension unit as in claim 11, further comprising:

means for transmitting a copy of said stored random security key before any communications with said base unit, and said base unit allowing said communications with said extension unit only if said copy of said security key matches said random security key.

13. An extension unit as in claim 11, further comprising:

means for initiating said requesting a copy of said random security key, operable by a user of said telephone extension system.

14. A method as in claim 13, wherein said means for initiating said requesting a copy of said random security key is a button on said extension unit.

* * * * *